United States Patent Office 2,706,197
Patented Apr. 12, 1955

2,706,197

PHENANTHROLINE-QUINONES AND PROCESS OF MAKING SAME

Jean Druey, Riehen, and Paul Schmidt, Therwil, Switzerland, assignors to Ciba Pharmaceutical Products, Inc., Summit, N. J.

No Drawing. Application April 30, 1951,
Serial No. 223,821

Claims priority, application Switzerland May 5, 1950

4 Claims. (Cl. 260—288)

This invention relates to the manufacture of phenanthroline-5:6-quinones, and especially the 1:10-, 1:7- and 4:7-phenanthroline-5:6-quinones of the formulae

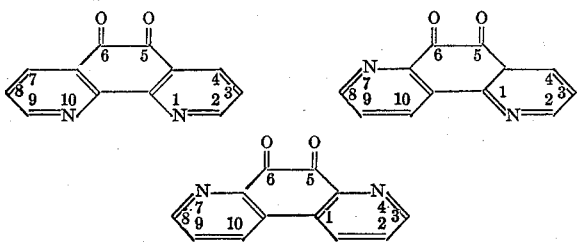

Repeated attempts have been made to prepare these compounds by the oxidation of phenanthrolines. A very wide variety of oxidizing agents such as selenium dioxide, vanadium pentoxide, iodic acid, periodic acid and chromic acid, has been used, but without success. The 5:6-phenanthroline-quinones were therefore regarded as unobtainable until Smith and Cagle (Journal of Organic Chemistry, vol. 12, page 781 [1947]) obtained small quantities of 1:10-phenanthroline-5:6-quinone as a by-product in the nitration of 1:10-phenanthroline. The yield thereby obtained amounted only to about 1 per cent. so that this process is not of any technical value. Experiments showed that it completely failed when using 1:7-phenanthroline and 4:7-phenanthroline. Accordingly, 1:7- and 4:7-phenanthroline-5:6 - quinones have not hitherto been known.

The present invention is based on the observation that phenanthroline-5:6-quinones are obtained in excellent yield by oxidizing with nitric acid a phenanthroline which contains in the 5- or 6-position a substituent convertible into an oxo group by oxidation.

As starting materials there may be used 1:10-, 1:7- or 4:7-phenanthrolines which contain in the 5- or 6-position, for example, a free or substituted hydroxyl group or amino group. These compounds may also contain substituents in the heterocyclic nucleus. The oxidation with nitric acid is advantageously carried out by means of concentrated nitric acid in the presence of sulfuric acid (nitrating acid). For this purpose it is of advantage to work at a raised temperature, for example, at 50–150° C.

The compounds used as starting materials, insofar as they are not known, can be obtained by the usual methods for preparing phenanthrolines. Thus, correspondingly substituted phenylene diamines, which contain two hydrogen atoms attached to vicinal carbon atoms, may be subjected to a twofold Skraup synthesis. It is also possible to start from phenanthrolines which contain in the 5- or 6-position, for example, a halogen atom or a sulfo group, and to replace that substituent by a substituent convertible into an oxo group by oxidation. It may also be of advantage, in the case of aminophenanthrolines, instead of forming the corresponding quinones directly, first to replace the amino groups by other especially suitable substituents, for example, a hydroxyl or alkoxy group, and only then to subject the product to oxidation with nitric acid.

The phenanthroline-5:6-quinones obtainable by the present invention are important intermediate products, especially for the manufacture of medicaments. Particularly valuable are the 1:7- and 4:7-phenanthroline-5:6-quinones. Thus, as disclosed in our application Serial No. 223,822, filed on even date herewith, now Patent No. 2,590,075, granted March 25, 1952, they can be reacted with a diprimary aliphatic amine, the amino groups of which are linked to adjacent carbon atoms, for example ethylene-1,2-diamine, to form 5:6:7:8-dipyrido-(5':6': 2":3")- and 5:6:7:8-dipyrido-(5':6':5":6")-quinoxalines. Their significance resides not only in the use as intermediate products, but also in their therapeutic properties. They have an antibacterial and antiparasitic action and can be used as medicaments.

The following examples illustrate the invention, the parts being by weight unless otherwise stated and the relationship of parts by weight to parts by volume being the same as that of the gram to the cubic centimeter.

Example 1

5 parts of 6-methoxy-1:7-phenanthroline are mixed with 25 parts by volume of concentrated sulfuric acid and, while cooling, with 15 parts by volume of fuming nitric acid (density=1.51), and the whole is heated for 2 hours at 120° C. The whole is then poured into 250 parts by volume of water and adjusted by means of a 10 N-solution of caustic soda to a pH value of 7. After a few hours the precipitate is separated by filtering with suction, washed with warm water and recrystallized from methanol. There are thus obtained 4.5 parts (i. e. 90 per cent. of the calculated yield) of 1:7-phenanthroline-5:6-quinone of the formula

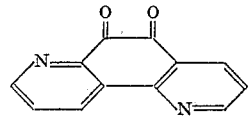

in the form of pale yellowish crystals melting at 255° C.

The 6-methoxy-1:7-phenanthroline used as starting material may be prepared in the following manner:

180 parts of arsenic acid are mixed with 180 parts by volume of water. Then 840 parts by volume of concentrated sulfuric acid, 360 parts by volume of glycerine and 60 parts of 2:4-diaminoanisole are slowly added while cooling by means of a mixture of ice and sodium chloride. The mixture is then heated for one hour at 80° C., then for a further hour at 100° C., and after further heating for 2 hours at 110° C. the reaction sets in suddenly and very vigorously so that cooling is necessary. The cooled contents of the flask are poured on to 2 parts by volume of ice water, filtered with suction to remove impurities, and adjusted to a pH value of 8 by means of a 10 N-solution of caustic soda, and extracted twice with 1½ parts by volume of chloroform. After evaporating the solvent, the residue is distilled at 169–170° C. under 0.2 mm. pressure, the product which solidifies in the receiver is recrystallized from benzene, and the resulting 6-methoxy-1:7-phenanthroline which is in the form of yellow crystals melts at 99° C.

Example 2

5 parts of 6-hydroxy-1:7-phenanthroline are mixed with 25 parts by volume of concentrated sulfuric acid and, while cooling, with 15 parts by volume of fuming nitric acid (density=1.51), and the whole is heated for 2 hours at 120° C. The whole is then poured into 250 parts by volume of water and adjusted by means of a 10 N-solution of caustic soda to a pH value of 7. After a few hours the precipitate is separated by filtering with suction, washed with warm water and recrystallized from methanol. There are thus obtained 4.5 parts (i. e. 90 per cent. of the calculated yield) of 1:7-phenanthroline-5:6-quinone of the formula

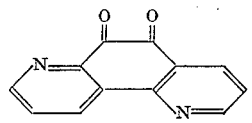

in the form of pale yellowish crystals melting at 255° C.

Example 3

2 parts of 6-methoxy-4:7-phenanthroline are mixed with 10 parts by volume of concentrated sulfuric acid and, while cooling with a mixture of ice and sodium chloride, with 6 parts by volume of fuming nitric acid (density=1.51), and the whole is heated for 2 hours at 120° C. The reaction solution is poured on to ice, its pH value is adjusted to 7 by means of a 10 N-solution of caustic soda, after standing for 2 hours the whole is filtered with suction to remove the precipitate which separates, and the latter is washed with hot water. After recrystallizing the product from methyl alcohol and drying it at 100° C. under 0.1 mm. pressure, there are obtained 1.8 parts (i. e. 90 per cent. of the calculated yield) of 4:7-phenanthroline-5:6-quinone in the form of pale yellow crystals melting at 295° C. It has the formula

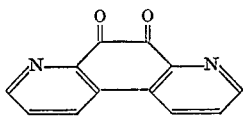

*Example 4*

1 part of 5-methoxy-1:10-phenanthroline is mixed with 5 parts by volume of sulfuric acid and, while cooling, with 3 parts by volume of fuming nitric acid (density=1.51), and the whole is heated for 1½ hours at 120° C. The reaction solution is then poured on to ice and its pH value is adjusted to 6 by means of a 10 N-solution of caustic soda while cooling with ice. The aqueous solution is concentrated to 30 parts by volume, and extracted with 500 parts by volume of warm chloroform. After evaporating the chloroform reddish crystals remain behind which are recrystallized from methyl alcohol. In this manner there is obtained 0.5 part (i. e. 50 per cent. of the calculated yield) of 1:10-phenanthroline-5:6-quinone of the formula

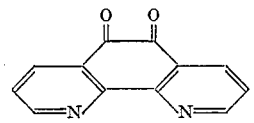

in the form of yellowish crystals melting at 250° C.

The above mentioned 5-methoxy-1:10-phenanthroline may be prepared, for example, in the following manner:

10 parts of 5-chloro-1:10-phenanthroline are heated with 4 parts of potassium hydroxide, 1 part of native copper, and 50 parts by volume of absolute methanol for 8 hours in a closed tube at 160° C. The methyl alcohol is then distilled off, the residue is extracted with 200 parts by volume of 2 N-hydrochloric acid, filtered with suction to remove impurities, rendered alkaline with caustic soda solution, and the aqueous solution is extracted by agitation with 750 parts by volume of chloroform. By recrystallizing the residue from ethyl acetate 5-methoxy-1:10-phenanthroline is obtained in the form of white crystals melting at 104–105° C.

*Example 5*

20 parts of 3-methyl-6-methoxy-4:7-phenanthroline are mixed with 100 parts by volume of concentrated sulfuric acid and, while cooling well, with 60 parts by volume of fuming nitric acid (density=1.51). The reaction solution is heated to 120° C. for 3 hours, then poured on to ice, and its pH value adjusted to 6–7 with 10 N-caustic soda solution. The yellow precipitate is separated by suction-filtering. From a little boiling methanol, the 3-methyl-4:7-phenanthroline-5:6-quinone of the formula

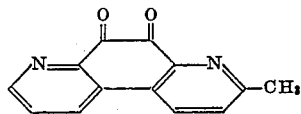

is obtained in the form of white crystals, which under reduced pressure decay at 100° C., while turning yellow and giving off methanol. The product melts at 230° C. with decomposition.

*Example 6*

4 parts of 6-amino-1:7-phenanthroline are mixed with 20 parts by volume of concentrated sulfuric acid and, while cooling, with 12 parts by volume of fuming nitric acid and the whole is heated to 120° C. for two hours. The reaction solution is poured on to ice and its pH adjusted to 7 with 10 N-caustic soda solution. The precipitate is separated by suction-filtering and recrystallized several times from a small quantity of boiling methanol, to obtain the 1:7-phenanthroline-5:6-quinone in the form of yellow crystals of melting point 255° C. which when mixed with the quinone obtained according to Example 1 do not give a lower melting point.

What we claim is:

1. A process for the manufacture of a phenanthroline-quinone, wherein a phenanthroline containing in one of the positions 5 and 6 a substituent selected from the group consisting of hydroxy, lower alkoxy and amino is oxidized with nitric acid.
2. A member selected from the group consisting of 1:7- and 4:7-phenanthroline-5:6-quinones.
3. 1:7-phenanthroline-5:6-quinone.
4. 4:7-phenanthroline-5:6-quinone.

References Cited in the file of this patent

Smith et al.: J. Org. Chem., vol. 12, pp. 781–784 (1947).